(12) United States Patent
Kutz et al.

(10) Patent No.: US 7,978,757 B1
(45) Date of Patent: Jul. 12, 2011

(54) CONFIGURABLE RECEIVER AND A METHOD FOR CONFIGURING A RECEIVER

(75) Inventors: Gideon Kutz, Ramat-Hasharon (IL); Amir Chass, Ramat-Hasharon (IL); Arik Gubeskys, Hod Hasharin (IL)

(73) Assignee: Freescale Semiconductor, Inc., Austin, TX (US)

( * ) Notice: Subject to any disclaimer, the term of this patent is extended or adjusted under 35 U.S.C. 154(b) by 762 days.

(21) Appl. No.: 12/028,018

(22) Filed: Feb. 8, 2008

(51) Int. Cl.
*H03H 7/30* (2006.01)
(52) U.S. Cl. .......................................... 375/229; 333/18
(58) Field of Classification Search .................. 375/229; 333/18
See application file for complete search history.

(56) References Cited

U.S. PATENT DOCUMENTS

| | | | |
|---|---|---|---|
| 5,777,910 A * | 7/1998 | Lu | 708/323 |
| 6,687,188 B2 * | 2/2004 | Yang | 367/134 |
| 7,263,123 B2 | 8/2007 | Yousef | |
| 7,769,078 B2 * | 8/2010 | Cairns et al. | 375/147 |
| 2003/0189995 A1 * | 10/2003 | Strolle et al. | 375/347 |
| 2004/0105489 A1 | 6/2004 | Kim et al. | |
| 2005/0084028 A1 | 4/2005 | Yu et al. | |
| 2005/0243955 A1 | 11/2005 | Mondragon-Torres et al. | |
| 2006/0159160 A1 | 7/2006 | Kim et al. | |

OTHER PUBLICATIONS

Hae-Sock Oh, "Sparse equalizer using adaptive weight activation for fast start-up in ATSC DTV systems" IEEE Transactions on Consumer Electronics, vol. 52, Issue: 1, Publication Year: 2006, pp. 92-96.*
Melvasalo, "Sparse equalization in high data rate WCDMA systems" SPAWC 2007. IEEE 8th Workshop on Signal Processing Advances in Wireless Communications, 2007, Publication Year: 2007, pp. 1-5.*
Kutz, "Sparse chip equalizer for DS-CDMA downlink receivers", IEEE communication letters, vol. 9, No. 1, Jan. 2005.*
Kutz, "Determination of Tap Positions for Sparse Equalizers", IEEE transactions on communications, vol. 55, No. 9, Sep. 2007.*
PCT Appl. No. PCT/US2009/030743 Search Report and Written Opinion mailed Jul. 8, 2009.

* cited by examiner

*Primary Examiner* — Juan A Torres (57) ABSTRACT

A configurable receiver and a method for configuring a receiver, the method includes: (i) evaluating multiple nonzero taps allocations, wherein each nonzero taps allocation evaluation includes: (i.a) allocating nonzero taps between multiple sparse equalizers, wherein different sparse equalizers are expected to equalize signals transmitted over different channels; wherein each channel is associated with an information source out of multiple information sources and with a receiving antenna out of multiple receiving antennas; wherein the number of nonzero taps is bounded by a upper limit; and (i.b) calculating multiple channel reception parameters of the multiple channels in response to the nonzero taps allocation; and (ii) configuring the receiver in response to a comparison between reception parameters obtained during different nonzero taps allocations.

20 Claims, 6 Drawing Sheets

Evaluating multiple nonzero taps allocations. Each nonzero taps allocation evaluation includes: (i) allocating nonzero taps between multiple sparse equalizers, wherein different sparse equalizers are expected to equalize signals transmitted over different channels; wherein each channel is associated with an information source out of multiple information sources and with a receiving antenna out of multiple receiving antennas; wherein the number of nonzero taps is bounded by a upper limit; and (ii) calculating multiple channel reception parameters of the multiple channels in response to the nonzero taps allocation. 120

Allocating nonzero taps to a certain sparse equalizer, calculating multiple channel reception parameters for multiple timings of the nonzero taps, and suggesting desired nonzero taps timing in response to the multiple channel reception parameters. 122

Allocating a nonzero tap to a certain sparse equalizer, calculating multiple channel reception parameters for multiple timings of the nonzero tap, and suggesting a desired nonzero tap timing that maximizes minimal gaps between the desired channel reception parameters and the calculated multiple channel reception parameters. 126

Applying a backward sequential algorithm. 124

Allocating a nonzero tap to a certain sparse equalizer, calculating multiple channel reception parameters for multiple timings of the nonzero taps, and suggesting a desired certain nonzero tap timing that minimizes maximal gaps between the desired channel reception parameters and the calculated multiple channel reception parameters. 130

Applying a forward sequential algorithm. 128

Calculating multiple channel reception parameters that reflect signal to noise ratios of the multiple channels. 132

Configuring the receiver in response to a comparison between reception parameters obtained during different nonzero taps allocations. 140

Configuring the receiver to apply a sparse equalization function that provides a weighted sum of signals from multiple receiving antennas memory circuits to a single information source memory circuit. 142

Receiving signals from the multiple channels and applying the multiple selected sparse equalizers to provide equalized signals. 160

CONFIGURABLE RECEIVER AND A METHOD FOR CONFIGURING A RECEIVER

FIELD OF THE INVENTION

The present invention relates to a configurable receiver and a method for configuring the receiver and especially to a receiver that applies multiple sparse equalizer to a method of configuring such a receiver.

BACKGROUND OF THE INVENTION

A modern receiver is expected to reconstruct signals that are transmitted over a communication channel (also referred to as channel) from an information source (such as a transmitting antenna) to a receiving antenna of the receiver. The so-called RAKE receivers are gradually replaced by equalizer-based receivers. An equalizer is expected to adjust itself (in real time or almost in real time) to a dynamically changing channel. It is known that the complexity of an equalizer configuration process that finds an optimal or even a sub-optimal equalizer configuration is responsive to the number of non-zero taps of the equalizer.

In order to reduce the complexity (and accordingly cost) of equalizer sparse equalizers were introduced. A sparse equalizer includes a small number of non-zero taps. A sparse chip equalizer that was designed to single channel and especially for direct access code division multiple access (DS-CDMA) downlink receivers was introduced by G. Kutz and A. Chass in "Sparse chip equalizer for DS-CDMA downlink receivers", IEEE communication letters, Vol. 9, No. 1, Jan. 2005.

The configuration process of a sparse equalizer includes selecting which taps are nonzero (this stage is also referred to selecting a timing of a nonzero tap) and then calculating the values of the non zero taps. It is noted that even this process is relatively complex and may involve evaluating only a sub set of tap allocations out of a much larger set of possible tap allocations.

Multiple input multiple output (MIMO) technology recently attracted attention in the wireless communication arena as it is expected to increase information throughput and channel range without additional bandwidth or transmit power.

It is expected that the complexity of configuring equalizers of MIMO receivers will dramatically increase and also will result in a dramatic increment of the cost of such equalizers.

There is a growing need to provide efficient methods for configuring a receiver and for efficient configurable receivers.

SUMMARY OF THE PRESENT INVENTION

The present invention provides a as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

FIG. 5 is a flow chart of a method for configuring a configurable receiver, according to an embodiment of the invention.

DETAILED DESCRIPTION OF PREFERRED EMBODIMENTS

The following figures illustrate exemplary embodiments of the invention. They are not intended to limit the scope of the invention but rather assist in understanding some of the embodiments of the invention. It is further noted that all the figures are out of scale.

A configurable receiver and a method for configurable receiver are provided. The number of nonzero taps of the configurable receiver is bound by a predefined upper limit (UP). The configurable receiver can implement different sparse equalizers. Each sparse equalizer is used to equalize signals that are transmitted over a channel (between a certain information source and a certain receiver). Taps can be allocated to different sparse equalizers and the position of the taps within each sparse equalizer can be set so as to improve the reconstruction of the received signals.

On one hand, the complexity of the receiver configuration process is reduced by placing an upper limit on the overall number of taps. On the other hand, by allocating taps on a channel to channel basis (thus a bank of taps can be shared by different receiver antennas and different information sources) the overall performance of the receiver is increased.

Conveniently, the complexity of the receiver configuring process is reduced by applying a sub-optimal tap allocation process during which one tap is allocated at a time. Thus, not all the possible allocations of nonzero taps are examined.

Figure 1:
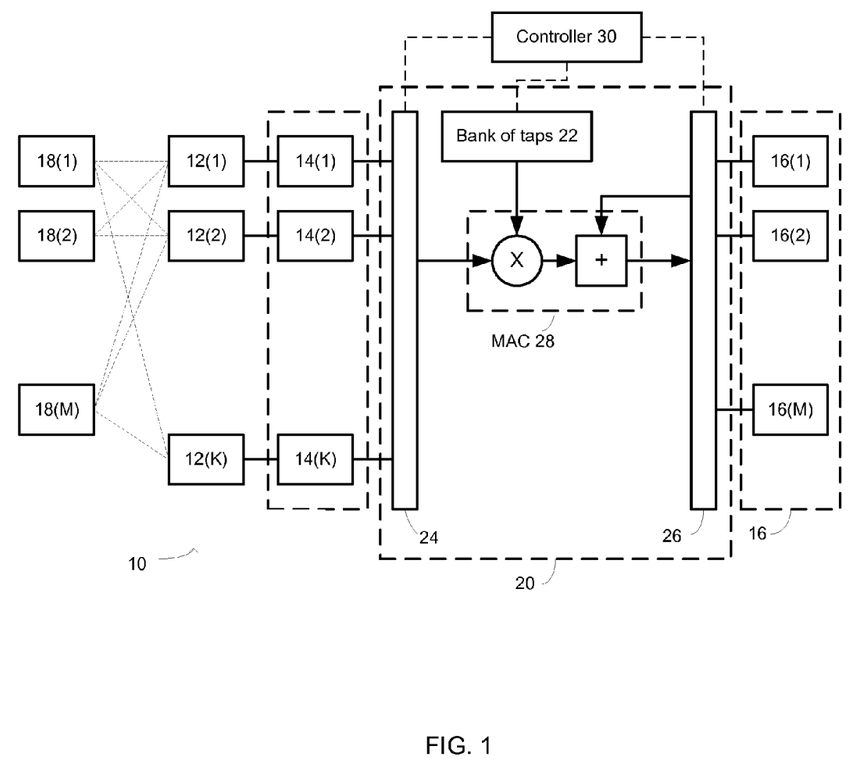
FIG. 1 illustrates a configurable receiver, according to an embodiment of the invention.

FIG. 1 illustrates a configurable receiver 10 according to an embodiment of the invention. Configurable receiver 10 receives signals from multiple (M) information sources 18(1)-18(M).

Configurable receiver 10 includes multiple (K) receiver antennas 12(1)-12(K), multiple (K) receiver antennas memory circuits 14(1)-14(K), multiple (M) information sources memory circuits 16(1)-16(M) and a configurable sparse equalization circuit 20 that is configurable so to implement multiple (P, P=K*M) "channel" sparse equalizers. Each of these channel sparse equalizers is associated with a channel between the K'th receiver antenna (12(K)) and the M'th information source (18(M)). These channels are illustrated by dashed lines that extend from each of the information sources to each of the receiver antennas.

It is noted that a group of "channel" sparse equalizers that are associated with the same information source (for example—18(M) can be regarded as a single "information source" sparse equalizer. The output signals of these "channel" sparse equalizers are summed in order to provide an equalized signal that is stored in information sources memory circuit 16(M).

For simplicity of explanation the "channel" sparse equalizers will be referred to as sparse equalizers.

Configurable sparse equalization circuit 20 includes bank 22 of taps, input selection circuits 24, output selection circuits 26 and a calculation circuit such as multiply-accumulate circuit (MAC) 28. The number of nonzero taps within bank 22 is limited by an upper limit (UP). Bank 22 can include zero and nonzero taps but can also include only nonzero taps.

Input selection circuits 24 elects which signals to retrieve. It can retrieve only signals that should be multiplied by nonzero taps. This selection corresponds to the position of nonzero taps. If a nonzero tap is positioned at a position that represent zero delay then the most recent signal will be retrieved from the relevant antenna receiver memory circuit and is sent to MAC 28 to be multiplied by this nonzero tap. MAC 28 multiples a signal from a receiver antenna memory circuit with a coefficient (from bank 22) that has a value that corresponds to the value of a tap and adds this product to an "old" information source signal (from the memory circuit of that information source) to provide a "current" information source signal.

Configurable sparse equalization circuit 20 can apply multiple sparse equalization functions by selecting which signals that are retrieved from the multiple (K) receiver antennas memory circuits 14(1)-14(K) are multiplied by which tap (zero tap or nonzero tap). This selection reflects the positions of nonzero taps of each sparse equalizer.

During signal reception periods the configurable sparse equalization circuit 20 can change its configuration in order to adjust to dynamically changing channel conditions. Typically, the configuration of configurable sparse equalization circuit 20 is evaluated each block of signals. The size of the block is conveniently proportional to how fast the channel impulse response of a channel changes. If, for example the turbo decoding is executed in a mobile phone than the size of the block is inversely proportional to the velocity of the mobile phone.

Configurable receiver 10 also includes controller 30. Controller 30 is adapted to evaluate multiple nonzero taps allocations of the multiple sparse equalizers, and to configure configurable sparse equalization circuit 20 in response to a comparison between reception parameters obtained by different nonzero taps allocations.

Figure 2:
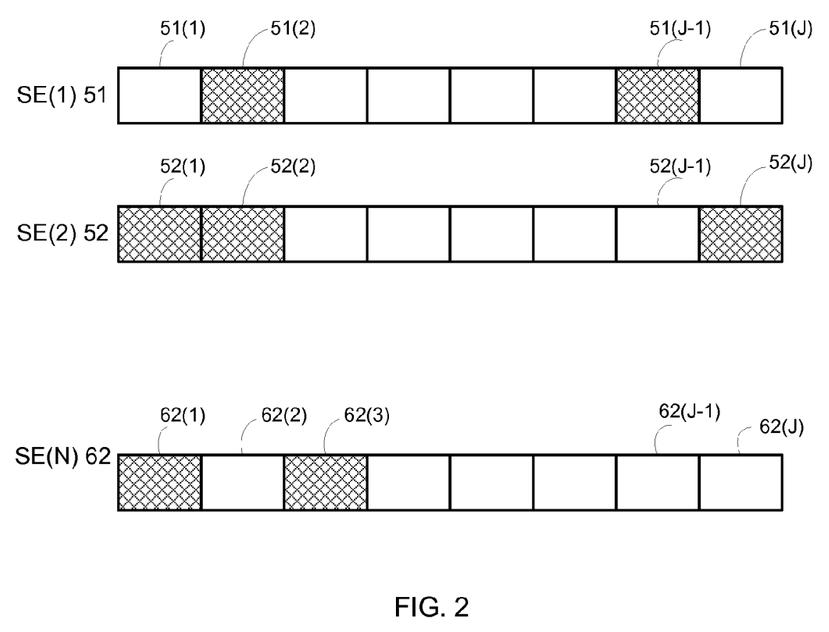
FIG. 2 illustrates multiple sparse equalizers according to an embodiment of the invention.

FIG. 2 illustrates a selection (an allocation) of non-zero taps for multiple (N) sparse equalizers, each including J taps. Thus first sparse equalizer SE(1) 51 includes J taps 51 (1)-51 (J), second sparse equalizer SE(2) 52 includes J taps 52(1)-52(J), and the N'th sparse equalizer SE(N) 62 includes J taps 62(1)-62(J). Most of these taps are zero, while only few taps per sparse equalizer are nonzero taps. The overall number of nonzero taps (in all sparse equalizers) is bounded by an upper limit (UP). These sparse equalizers are actually implemented by configurable sparse equalization circuit 20.

Conveniently, there are few nonzero tap positions (out of J possible nonzero tap positions) that are evaluated during the configuration process of receiver 10. A position of such an evaluated nonzero tap can be responsive to locations of channel multi-path interferences, and additionally or alternatively to locations of other evaluated nonzero taps. In FIG. 2 an evaluated nonzero tap position is represented by a patterned box such as patterned boxes 51 (2), 51 (J−1), 52(1), 52(2), 52(J), 61 (1) and 62(3).

It is noted that the M'th group of sparse equalizers (SE(1+(M−1)*K)SE (M*K) can be regarded as the M'th "transmitter" sparse equalizer. The output signals of these sparse equalizers are conveniently summed to provide an equalized signal that is stored in information source memory circuit 16(M). Accordingly, channel reception parameters are calculated in response to a channel impulse response as well as output signals from each "transmitter" sparse equalizer (sum of outputs of the corresponding group of "channel" sparse equalizers). The channel reception parameters can include calculating a signal to noise ratio, mean square error and the like.

It is noted that the configuration of the configurable receiver is based upon signals that were received by the receiver or in response to signals that are expected to be received by the receiver.

Figure 3:
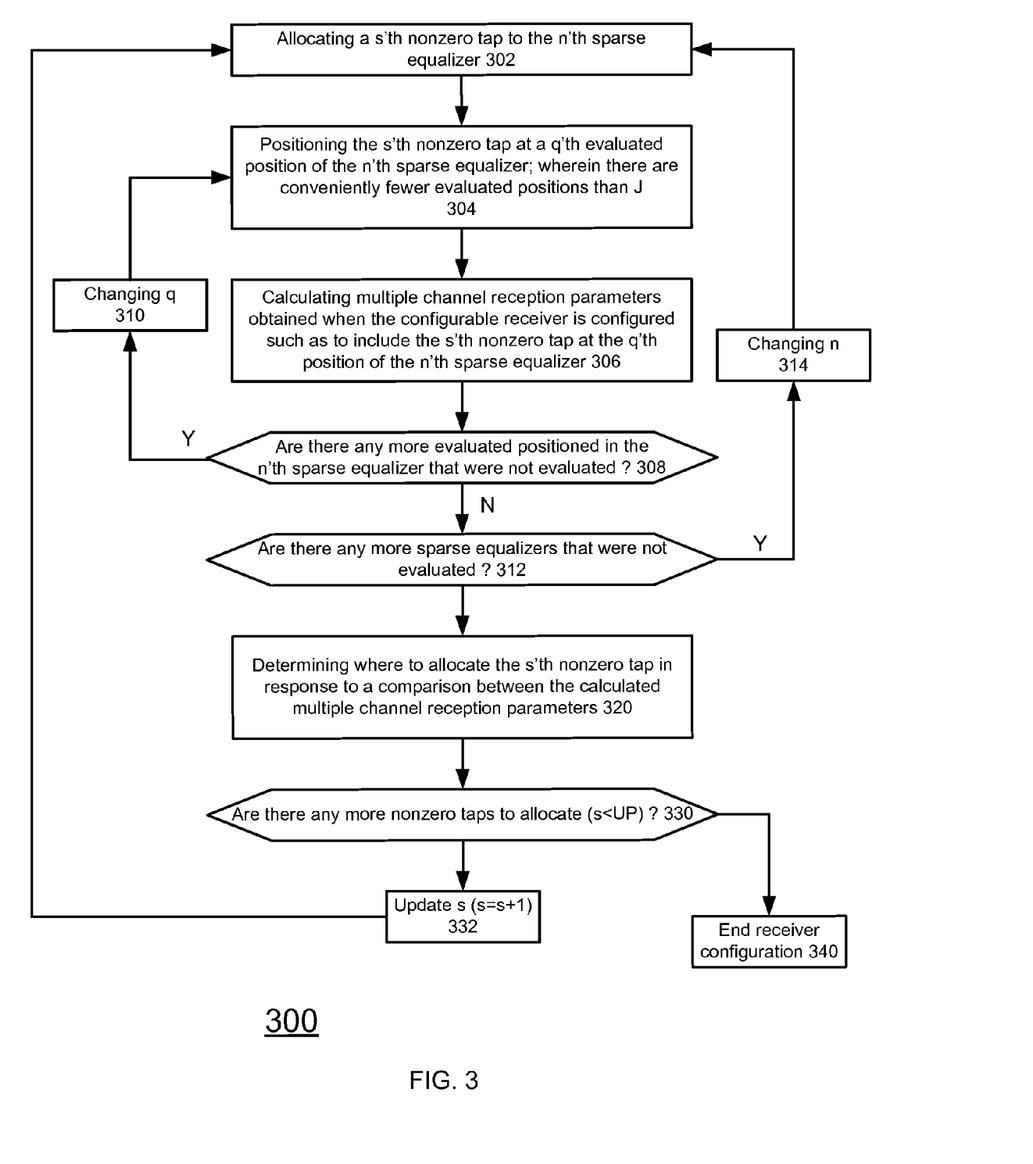
FIG. 3 illustrates a forward sequential algorithm that is applied during a configuration of the configurable receiver.

FIG. 3 illustrates forward sequential algorithm 300 that is applied during a configuration of the configurable receiver. The forward sequential algorithm starts with empty sparse equalizers and finds, one nonzero tap after the other where to place nonzero taps.

It is assumed that when forward sequential algorithm 300 starts index s equals one, index n equals one and index q equals one.

Stage 302 includes allocating the s'th nonzero tap to the n'th sparse equalizer.

Stage 302 is followed by stage 304 of positioning the s'th nonzero tap at a q'th evaluated position of the n'th sparse equalizer; wherein there are conveniently fewer evaluated positions than J.

Stage 304 is followed by stage 306 of calculating multiple channel reception parameters obtained when the configurable receiver is configured such as to include the s'th nonzero tap at the q'th position of the n'th sparse equalizer.

Stage 306 is followed by stage 308 of determining if there are any more evaluated positioned in the n'th sparse equalizer that were not evaluated.

If the answer is positive (Y) stage 308 is followed by stage 310 of changing index q and jumping to stage 304. If the answer is negative (N) stage 308 is followed by stage 312 of determining whether there any more sparse equalizers that were not evaluated. If the answer is positive (Y) stage 312 is followed by stage 314 of changing index n and jumping to stage 302. If the answer is negative (N) stage 312 is followed by stage 320 of determining where to allocate the s'th nonzero tap in response to a comparison between the calculated multiple channel reception parameters.

Stage 320 is followed by stage 330 of determining whether there any more nonzero taps to allocate (s<UP). If the answer is positive (Y) stage 330 is followed by stage 332 of updating s (for example s=s+1) and jumping to stage 302. If the answer is negative (N) stage 330 is followed by stage 340 of ending the receiver configuration. Typically after a predetermined period a new process starts.

A forward sequential algorithm and a backward sequential algorithm are illustrated in "Determination of Tap Positions for Sparse Equalizers", Gideon Kutz and Dan Raphaeli, IEEE transactions on communications. Vol. 55, No. 9, Sep. 2007, which is incorporated herein by reference.

Figure 4:
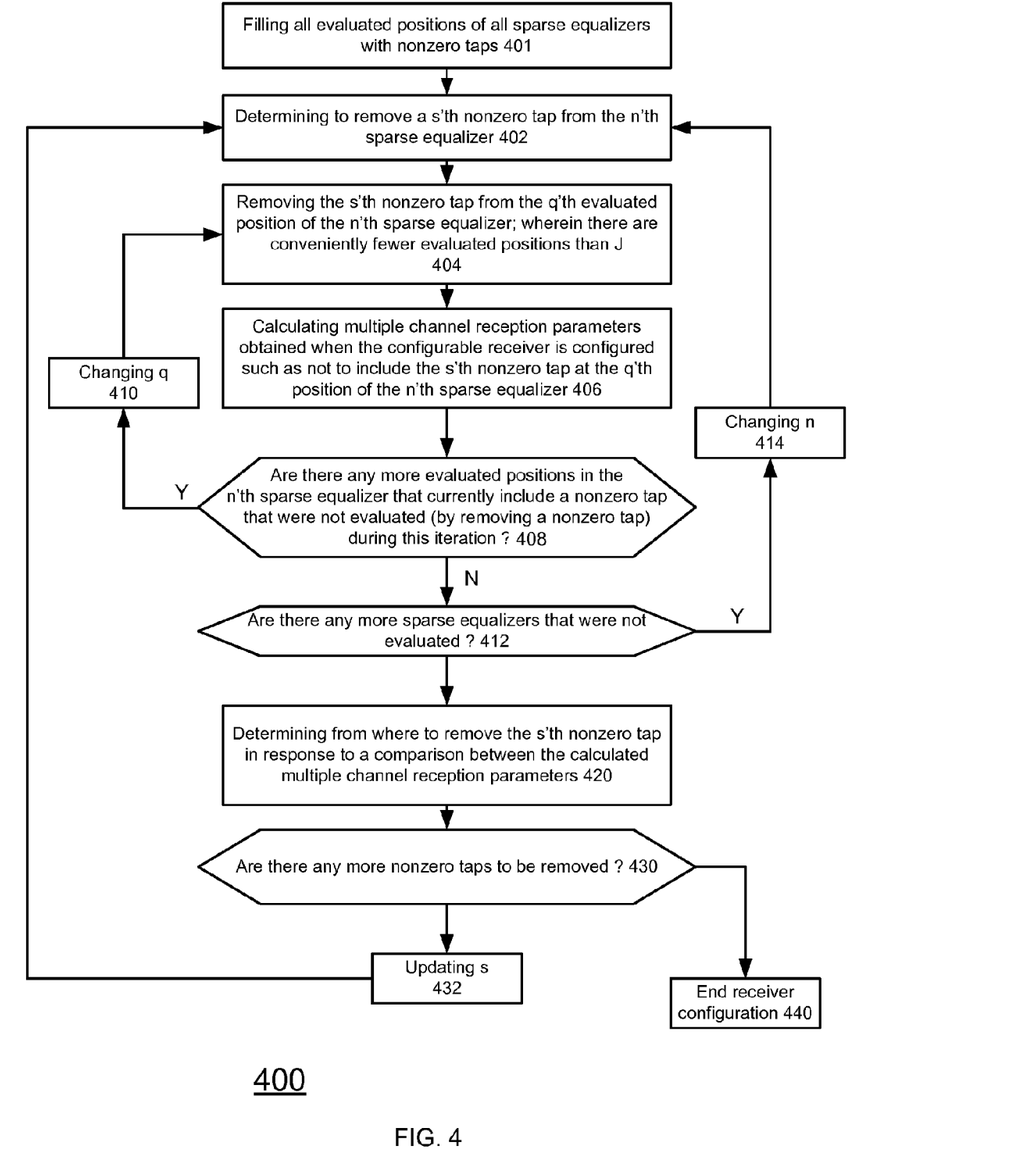
FIG. 4 illustrates a backward sequential algorithm that is applied during a configuration of the configurable receiver.

FIG. 4 illustrates backward sequential algorithm 400 that is applied during a configuration of the configurable receiver. The backward sequential algorithm 400 starts with full sparse equalizers (include nonzero taps in each evaluated position or in each position of the entire sparse equalizer)) and finds, one nonzero tap after the other from where to remove nonzero taps. The filling is performed during initializing stage 401.

It is assumed that when forward sequential algorithm 400 starts index s equals one, index n equals one and index q equals one.

Stage 402 includes determine to remove the s'th nonzero tap to the n'th sparse equalizer.

Stage 402 is followed by stage 404 of removing the s'th nonzero tap from a q'th evaluated position of the n'th sparse equalizer; wherein there are conveniently fewer evaluated positions than J.

Stage 404 is followed by stage 406 of calculating multiple channel reception parameters obtained when the configurable receiver is configured such as to not to include the s'th nonzero tap at the q'th position of the n'th sparse equalizer.

Stage 406 is followed by stage 408 of determining if there are any more evaluated positioned in the n'th sparse equalizer that currently includes nonzero taps that were not ere not evaluated (by removing a nonzero tap) during this iteration of algorithm 400.

If the answer is positive (Y) stage 408 is followed by stage 410 of changing index q and jumping to stage 404. If the answer is negative (N) stage 408 is followed by stage 412 of determining whether there any more sparse equalizers that were not evaluated. If the answer is positive (Y) stage 412 is followed by stage 414 of changing index n and jumping to stage 402. If the answer is negative (N) stage 412 is followed by stage 420 of determining from where to remove the s'th nonzero tap in response to a comparison between the calculated multiple channel reception parameters.

Stage 420 is followed by stage 430 of determining whether there any more nonzero taps to be removed (nonzero taps should be removed until the overall number of nonzero tap equals UP). If the answer is positive (Y) stage 430 is followed by stage 432 of updating s (for example s=s+1) and jumping to stage 402. If the answer is negative (N) stage 430 is followed by stage 440 of ending the receiver configuration. Typically after a predetermined period a new process starts.

FIG. 5 is a flow chart of method 100 according to an embodiment of the invention.

Method 100 starts by stage 120 of evaluating multiple nonzero taps allocations. Each nonzero taps allocation evaluation includes: (i) allocating nonzero taps between multiple sparse equalizers, wherein different sparse equalizers are expected to equalize signals transmitted over different channels; wherein each channel is associated with an information source out of multiple information sources and with a receiving antenna out of multiple receiving antennas; wherein the number of nonzero taps is bounded by a upper limit; and (ii) calculating multiple channel reception parameters of the multiple channels in response to the nonzero taps allocation.

Stage 120 can include either one of the following stages or a combination thereof: (i) stage 122 of allocating a nonzero tap to a certain sparse equalizer, calculating multiple channel reception parameters for multiple timings of the nonzero tap, and suggesting desired nonzero tap timing in response to the multiple channel reception parameters; (ii) stage 124 of applying a backward sequential algorithm (for example—applying backward sequential algorithm 400 of FIG. 4); (iii) stage 128 of applying a forward sequential algorithm (for example—applying forward sequential algorithm 300 of FIG. 3); and (iv) stage 132 of calculating multiple channel reception parameters that reflect signal to noise ratios of the multiple channels.

Stage 124 can include stage 126 of allocating a nonzero tap to a certain sparse equalizer, calculating multiple channel reception parameters for multiple timings of the nonzero tap, and suggesting a desired nonzero tap timing that maximizes minimal gaps between the desired channel reception parameters and the calculated multiple channel reception parameters.

Stage 128 can include stage 130 of allocating a nonzero tap to a certain sparse equalizer, calculating multiple channel reception parameters for multiple timings of the nonzero tap, and suggesting a desired certain nonzero tap timing that minimizes maximal gaps between the desired channel reception parameters and the calculated multiple channel reception parameters.

Stage 120 is followed by stage 140 of configuring the receiver in response to a comparison between reception parameters obtained during different nonzero taps allocations.

Stage 140 can include stage 142 of configuring the receiver to apply a sparse equalization function that provides a weighted sum of signals from multiple receiving antennas memory circuits to a single information source memory circuit. For example, signals from multiple receiving antennas memory circuits that were transmitted by a single information source can be equalized by a group of channel sparse equalizers and the outputs of these channel sparse equalizers can be added to each other to provide an equalized signal that is sent to a corresponding information source memory unit as indicated in stage 142

Stage 140 is conveniently followed by stage 160 of receiving signals from the multiple channels and applying the multiple selected sparse equalizers to provide equalized signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Figure 6:
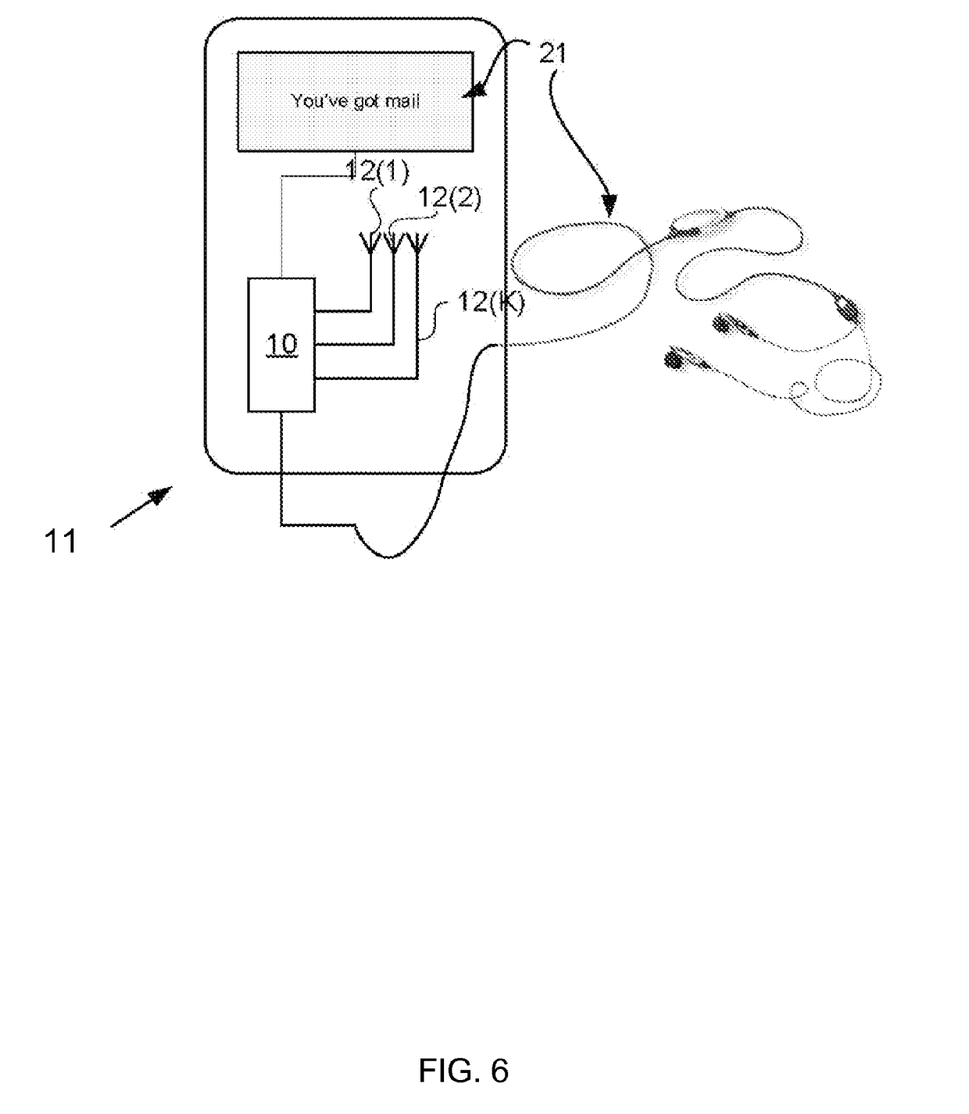
FIG. 6 illustrates a wireless communication device, according to an embodiment of the invention

FIG. 6 illustrates an wireless communication device 11. The device 11 includes multiple receiver antennas 12(1)-12(K) and a configurable receiver 10. The configurable receiver 10 may for example be implemented as illustrated in FIG. 1. As shown, the configurable receiver 10 is connected to the multiple receiver antennas 12(1)-12(K) and can process wireless signals received with the antennas 12(1)-12(K). The device 11 further has a user interface 21 at which signals derived from wireless signals received by said receiver can be outputted in a for humans perceptible form, for example as audio or video. For sake of simplicity, the receiver 10 is shown directly connected to the interface 21 in the example of FIG. 6. However it will be apparent that intermediate elements may be present between the receiver and the interface, such as an RF processor, a baseband processor or other suitable circuitry.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, FIG. 1 illustrates controller as being included in configurable receiver but this is not necessarily so. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

We claim:

1. A method for configuring a receiver, the method comprising:
    evaluating multiple nonzero taps allocations, wherein each nonzero taps allocation evaluation comprises: allocating nonzero taps between multiple sparse equalizers, wherein different sparse equalizers are expected to equalize signals transmitted over different channels; wherein each channel is associated with an information source out of multiple information sources and with a receiving antenna out of multiple receiving antennas; wherein the number of nonzero taps is bounded by a upper limit; and calculating multiple channel reception parameters of the multiple channels in response to the nonzero taps allocation; and
    configuring the receiver in response to a comparison between reception parameters obtained during different nonzero taps allocations.

2. The method according to claim 1 comprising allocating a nonzero tap to a certain sparse equalizer, calculating multiple channel reception parameters for multiple timings of the nonzero tap, and suggesting a desired nonzero tap timing in response to the multiple channel reception parameters.

3. The method according to 2 wherein the suggesting is responsive to gaps between desired channel reception parameters and the calculated multiple channel reception parameters.

4. The method according to claim 1 wherein the evaluating comprises applying a backward sequential algorithm.

5. The method according to claim 4 comprising allocating a nonzero tap to a certain sparse equalizer, calculating multiple channel reception parameters for multiple timings of the nonzero tap, and suggesting a desired nonzero tap timing that maximizes minimal gaps between the desired channel reception parameters and the calculated multiple channel reception parameters.

6. The method according to claim 1 wherein the evaluating comprises applying a forward sequential algorithm.

7. The method according to claim 6 comprising allocating a nonzero tap to a certain sparse equalizer, calculating multiple channel reception parameters for multiple timings of the nonzero tap, and suggesting a desired certain nonzero tap timing that minimizes maximal gaps between the desired channel reception parameters and the calculated multiple channel reception parameters.

8. The method according to claim 1 wherein the configuring comprising configuring the receiver to apply a sparse equalization function that provides a weighted sum of signals from multiple receiving antennas memory circuits to a single information source memory circuit.

9. The method according to claim 1 comprises calculating multiple channel reception parameters that reflect signal to noise ratios of the multiple channels.

10. A configurable receiver, comprising: multiple receiver antenna memory circuits; wherein each receiver antenna memory circuit is adapted to store signals received by a receiver antenna out of multiple receiver antennas; multiple information source memory circuits; wherein each information source memory circuit is adapted to store equalized signals that were transmitted by an information source out of multiple information sources; a configurable sparse equalization circuit that is configurable so as to implement multiple sparse equalizers; and a controller, adapted to evaluate multiple nonzero taps allocations of the multiple sparse equalizers, and to configure the configurable sparse equalization circuit in response to a comparison between reception parameters obtained during different nonzero taps allocations.

11. The configurable receiver according to claim 10 wherein the controller is adapted to allocate a certain nonzero tap to a certain sparse equalizer, calculate multiple channel reception parameters for multiple timings of the certain nonzero tap, and suggest a desired certain nonzero tap timing in response to the multiple channel reception parameters.

12. The configurable receiver according to 11 wherein the suggestion is responsive to gaps between desired channel reception parameters and the calculated multiple channel reception parameters.

13. The configurable receiver according to claim 12 wherein the controller is adapted to apply a backward sequential algorithm.

14. The configurable receiver according to claim 13 wherein the controller is adapted to allocate a certain nonzero tap to a certain sparse equalizer, calculate multiple channel reception parameters for multiple timings of the certain nonzero tap, and suggest a desired certain nonzero tap timing that maximizes minimal gaps between the desired channel reception parameters and the calculated multiple channel reception parameters.

15. The configurable receiver according to claim 10 wherein the controller is adapted to apply a forward sequential algorithm.

16. The configurable receiver according to claim 15 wherein the controller is adapted to allocate a certain nonzero tap to a certain sparse equalizer, calculate multiple channel reception parameters for multiple timings of the certain nonzero tap, and suggest a desired certain nonzero tap timing that minimizes maximal gaps between the desired channel reception parameters and the calculated multiple channel reception parameters.

17. The configurable receiver according to claim 10 wherein the controller is adapted to apply an equalizer that provides an weighted sum of signals from multiple receiving antennas memory circuits to a single information source memory circuit.

18. The configurable receiver according to claim 10 wherein the controller is adapted to calculate multiple channel reception parameters that reflect signal to noise ratios of the multiple channels.

19. The configurable receiver according to claim 10 adapted to receive signals from the multiple channels and apply the multiple selected sparse equalizers to provide equalized signals to the multiple information source memory circuits.

20. An wireless communication device, including:
multiple receiver antennas;
a configurable receiver according to claim 10, connected to said multiple receiver antennas; and
a user interface for outputting signals derived from wireless signals received by said receiver in a for humans perceptible form.

* * * * *